(12) United States Patent
Nguyen et al.

(10) Patent No.: US 7,276,198 B2
(45) Date of Patent: Oct. 2, 2007

(54) METHOD AND MOLD FOR MAKING TIRE WITH TIE BAR

(75) Inventors: Gia-Van Nguyen, Rossignol (BE); Anne-France Gabrielle Jeanne-Marie Cambron, Angelsberg (BE); Raymond Marie Joseph Ghislain Houba, Vaux-sur-Sure (BE); Frank Severens, Frassem/Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 262 days.

(21) Appl. No.: 11/024,111

(22) Filed: Dec. 28, 2004

(65) Prior Publication Data

US 2006/0137794 A1 Jun. 29, 2006

(51) Int. Cl.
 B29C 33/42 (2006.01)
 B29C 33/44 (2006.01)
 B29C 43/42 (2006.01)
 B29D 30/52 (2006.01)
 B60C 11/11 (2006.01)

(52) U.S. Cl. ............ 264/318; 152/209.17; 152/209.22; 264/326; 425/28.1; 425/37; 425/46; 425/438; 425/DIG. 58

(58) Field of Classification Search ........... 152/209.17, 152/209.22; 264/326, 318; 425/28.1, 37, 425/46, 438, DIG. 58; 156/110.1, 113, 394.1
See application file for complete search history.

(56) References Cited

U.S. PATENT DOCUMENTS

| | | | |
|---|---|---|---|
| 5,022,448 A | * | 6/1991 | Ochiai .................... 152/209.22 |
| 5,353,854 A | | 10/1994 | Landers et al. |
| 5,824,169 A | | 10/1998 | Landers et al. |
| 6,143,223 A | * | 11/2000 | Merino Lopez ............ 264/326 |
| 6,318,983 B1 | * | 11/2001 | Lopez et al. ................ 425/28.1 |
| 6,408,910 B1 | * | 6/2002 | Lagnier et al. ........ 152/209.17 |
| 6,454,554 B1 | | 9/2002 | Lopez et al. |
| 6,461,135 B1 | | 10/2002 | Lagnier et al. |

(Continued)

FOREIGN PATENT DOCUMENTS

EP 0 342 908 11/1989

(Continued)

OTHER PUBLICATIONS

European Patent Office, European Search Report for Application 051125459.2, Mar. 31, 2006 (7 pages).

*Primary Examiner*—Steven D. Maki
(74) *Attorney, Agent, or Firm*—Wood, Herron & Evans LLP

(57) ABSTRACT

A tire having an outer surface and plurality of circumferential and lateral grooves formed into the outer surface. The circumferential and lateral grooves extend to at least one groove depth to define a groove bottom surface. The circumferential and lateral grooves also define a plurality of tread blocks disposed around the circumference of the tire. The tire further includes at least one tie bar extending between at least two of the tread blocks and across at least one of the circumferential and lateral grooves. The tie bar is spaced from the groove bottom surface. In one aspect of the invention, the tire is manufactured in a mold and the tie bar is formed by a supplemental molding member that is removed from the molded tire after the main molding member has been removed from the tire.

7 Claims, 4 Drawing Sheets

U.S. PATENT DOCUMENTS

| | | |
|---|---|---|
| 6,484,772 B1 | 11/2002 | De Labareyre et al. |
| 6,631,746 B2 | 10/2003 | Neumann |
| 6,695,024 B2 | 2/2004 | Neugebauer et al. |
| 2002/0142056 A1 | 10/2002 | Aperce et al. |

FOREIGN PATENT DOCUMENTS

| | | | |
|---|---|---|---|
| JP | 2002-307442 A | | 10/2002 |
| JP | 2002-331526 | * | 11/2002 |

* cited by examiner

METHOD AND MOLD FOR MAKING TIRE WITH TIE BAR

FIELD OF THE INVENTION

The present invention relates generally to pneumatic tires, and more particularly to an improved tire tread design using tie bars.

BACKGROUND OF THE INVENTION

Conventional tire designs utilize treads with circumferentially and laterally extending grooves that divide the tire tread into a plurality of block elements. The grooves expel water from beneath the tread to prevent hydroplaning and also to provide improved traction in snow, mud, and wet road conditions. In some designs, however, small tread blocks can reduce tire stiffness, thereby affecting performance and causing irregular wear of the tread. One solution to this problem has been to reinforce small tread blocks by connecting them to adjacent tread blocks with tie bars. The tie bars are typically formed in the bottom of the groove and do not extend all the way to the top of the tread blocks.

While tie bars help to improve handling and reduce irregular wear, the location of tie bars in the bottoms of the grooves does not provide optimal performance. Specifically, this tie bar configuration does not reinforce the upper ends of the tread blocks where it is needed, and thereby provides only a limited increase in stiffness when the tire is new. Having tie bars in the bottoms of the grooves also tends to cause excessive stiffness of the tread blocks as the tire becomes worn from use. Moreover, the location of tie bars in the bottoms of grooves inhibits the water expelling function of the grooves.

A need therefore exists for an improved tire tread design which overcomes these and other drawbacks of the prior art.

SUMMARY OF THE INVENTION

The present invention provides a tire design having tread blocks that are reinforced by tie bars which extend between upper portions of the tread blocks to provide increased stiffness when the tire is new. The tie bars are diminished as the tread wears and therefore do not contribute to increased tread stiffness during the life of the tire. In one embodiment, the tread blocks are defined by circumferential and lateral grooves formed into the outer surface of the tire. The tire includes at least one tie bar extending between at least two of the tread blocks. The tie bar extends across at least one of the circumferential and lateral grooves and is spaced from the groove bottom surface. Accordingly, the tie bar is worn away with the tread block as the tire wears. Moreover, because the tie bar does not extend to the groove bottom surface, the tie bar of the present invention does not inhibit the grooves from expelling water outwardly of the tire tread.

In another embodiment, a tire according to the present invention is formed in a mold having at least one first molding member for forming the tread, and at least a second molding member for forming the tie bar. The second molding member is separable from the first molding member such that the first and second molding members may be separately removed from the formed tire. The second molding member includes a groove-engaging portion that extends to the formed groove bottom surface such that the formed tie bar is spaced from the formed groove bottom surface. In another embodiment, the second molding member is resiliently coupled to the first molding member such that when the first molding member is removed from the formed tire, the resilient coupling facilitates automatic removal of the second molding member from the formed tire.

The features and objectives of the present invention will become more readily apparent from the following Detailed Description taken in conjunction with the accompanying drawings.

Definitions

"Axial" and "axially" refer to lines or directions that are parallel to the axis of rotation of the tire.

"Block element" and "tread block" refer to tread elements defined by a circumferential groove or shoulder and a pair of lateral extending grooves.

"Circumferential" means lines or directions extending along the perimeter of the surface of the annular tread, perpendicular to the axial direction.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion (the width of which is in question) divided by the length of such groove or groove portion; thus, the groove width is its average width over its length. Grooves may have varying depths in a tire. The depth of a groove may vary around the circumference of the tread, or the depth of one groove may be constant but vary from the depth of another groove in the tire.

"Lateral" means an axial direction.

"Radial" and "radially" refer to directions radially toward or away from the axis of rotation of the tire.

"Tie bar" refers to an extra thickness of rubber, conventionally at the bottom of a groove such that, in the locations where the extra rubber is present, the groove depth is less than the groove depth at all other locations. Tie bars stabilize a tread block by limiting the independent movement of two tread blocks that are separated by grooves.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
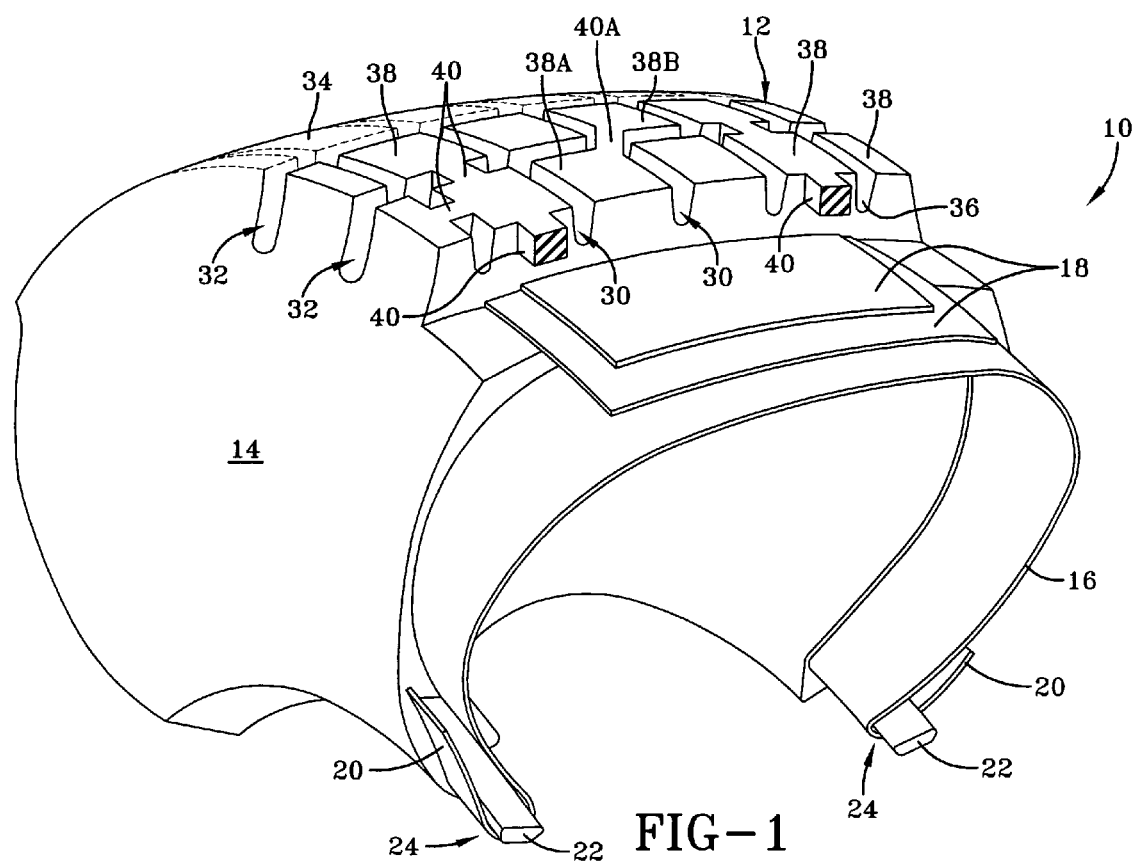
FIG. 1 is a partial cross-sectional perspective view depicting an exemplary tire according to the present invention.
Figure 2:
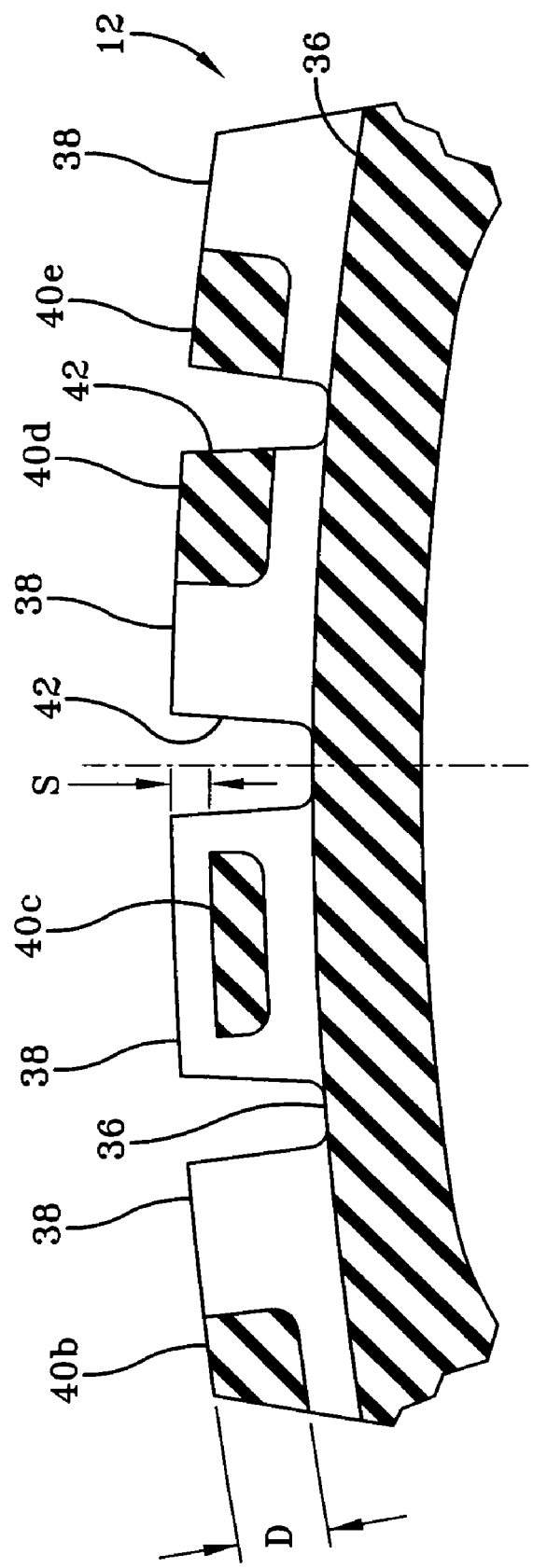
FIG. 2 is a cross-sectional detail depicting the tire tread of FIG. 1.

FIGS. 1 and 2 depict an exemplary tire 10 according to the present invention. The tire 10 includes a tread 12 and sidewalls 14 molded around a carcass reinforcing ply 16 and one or more belts 18 as known in the art. The carcass reinforcing ply 16 has opposed ends 20 which are wrapped around circumferentially extending bead cores 22 to form the rim engaging portions 24 of the tire. The tire tread 12 extends circumferentially around the tire 10 and includes a plurality of circumferential grooves 30 and lateral grooves 32 formed into an outer surface 34 of the tire. The circumferential and lateral grooves 30, 32 extend into the outer surface 34 to at least one groove depth D to define at least one groove bottom surface 36. While only one groove bottom surface is shown and described herein, it will be recognized that one or more of the circumferential and lateral grooves 30, 32 may be formed to different groove depths to thereby form different groove bottom surfaces. The circumferential and lateral grooves 30, 32 define a plurality of tread blocks 38 extending around the circumference of the tire. The tire 10 further includes at least one tie bar 40 extending between adjacent tread blocks 38. The tie bar 40 may extend across a circumferential groove 30, a lateral groove 32, or across both a circumferential and lateral groove, as depicted in FIG. 1 by tie bar 40a which extends between diagonally disposed tread blocks 38a and 38b.

The tie bars 40 extend in directions toward the groove bottom surface 36, but are spaced from the groove bottom surface 36. In one embodiment, the spaces between the tie bars 40 and the groove bottom surface 36 provide passageways through which water may be directed outwardly of the tread 12. The tie bars 40 may extend from the outer surface 34 of the tire 10, or they may be spaced a distance S from the outer surface 34 of the tire, as depicted by tie bar 40c shown in FIG. 2.

As depicted in FIGS. 1 and 2, the tie bars 40 may be positioned at any location on the tread blocks 38 to extend between adjacent tread blocks. For example, tie bars may be located to be co-extensive with the sides 42 of the tread blocks 38, which are defined by the circumferential and lateral grooves 30, 32 (see, for example, tie bars 40b, 40d, 40e), or the tie bars may be centrally located between the sides 42 of a tread block 38, as depicted by tie bar 40b. The tie bars 40 may also extend in a generally circumferential direction, in a generally lateral direction, or substantially diagonally across the tread 12 to join diagonally disposed tread blocks, such as tread blocks 38a, 38b described above.

Figure 3:
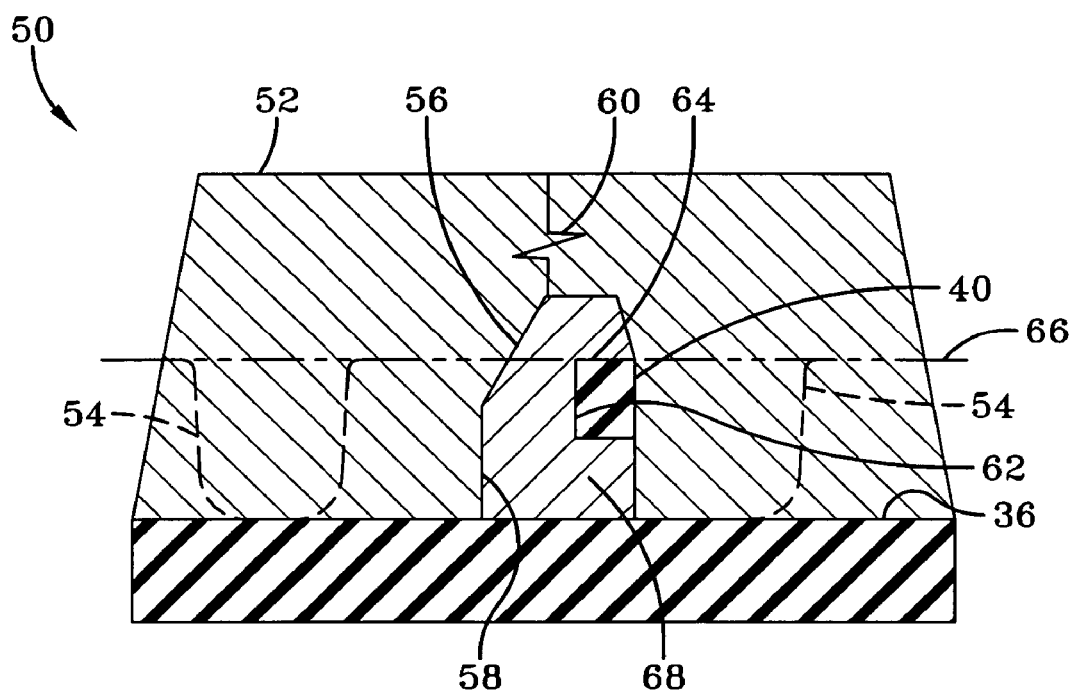
FIGS. 3-5 are schematic illustrations depicting exemplary mold elements and a method for forming a tire according to the present invention.
Figure 4:
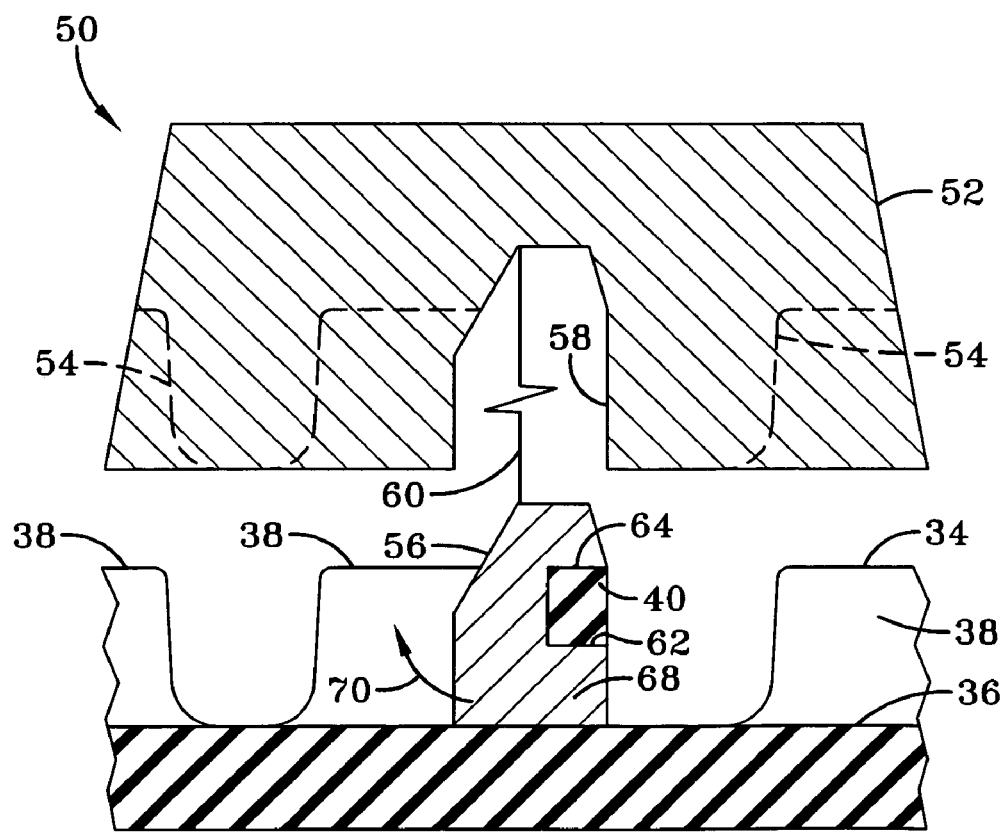
Figure 5:
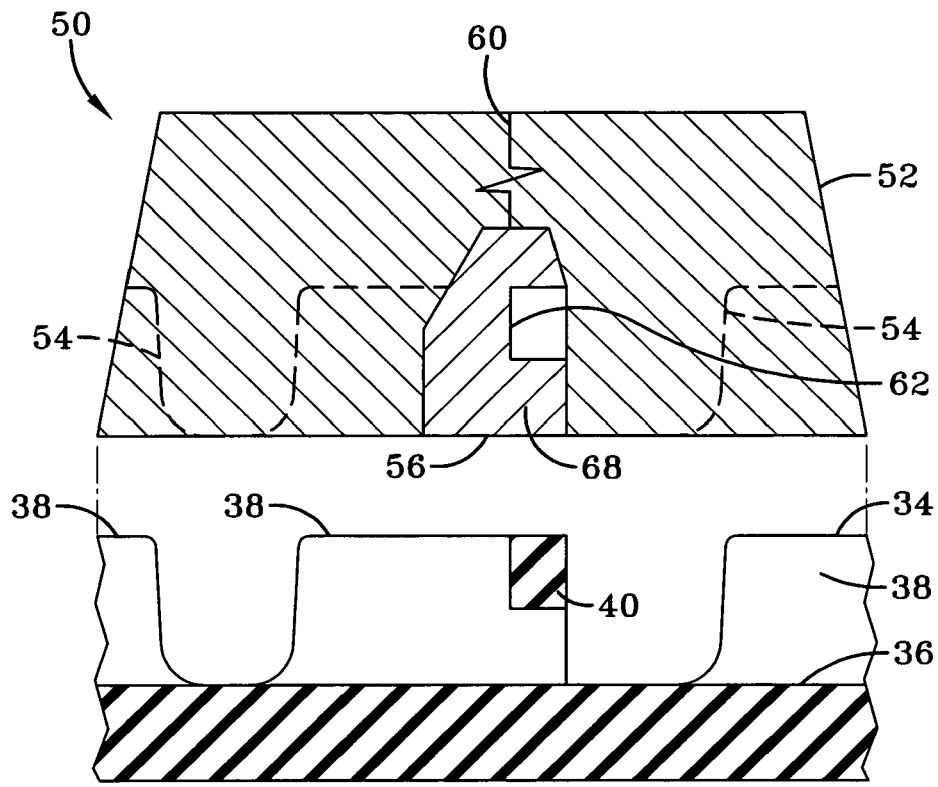

Referring now to FIGS. 3-5, an exemplary mold configuration that facilitates forming tie bars 40 in a tire 10 according to the present invention will be described. The mold 50 may be a clamshell-type mold that is configured to receive the structural components and elastomeric material used to form a tire, as known in the art. FIGS. 3-5 depict that portion of the mold 50 which forms a section of the tire 10, proximate tread 12, as shown in FIG. 2. In the embodiment shown, the mold 50 includes a first molding member 52 having a plurality of radially inwardly extending protrusions 54 (shown in dashed lines) that define the circumferential and lateral grooves of the tire tread 12. The mold 50 further includes at least one second molding member 56 configured to be joined with the first molding member 52 and which forms at least one tie bar 40 between at least two adjacent tread blocks 38 that are defined by the circumferential and lateral grooves 30, 32 formed by the first molding member 52.

As best depicted in FIG. 4, the first molding member 52 includes a cavity 58 that is sized and shaped to receive the second molding member 56 at a location desired for forming a tie bar 40. The second molding member 56 is resiliently coupled to the first molding member 52, such as by springs 60, to bias the second member 56 into the cavity 58 formed in the first molding member 52. The second molding member 56 includes a void 62 that is sized and shaped to define the tie bar 40. The void 62 has an upper edge 64 which corresponds with the outer surface 34 of the tire tread 12, indicated by phantom line 66 in FIG. 3, such that the tie bar 40 does not extend beyond the outer surface 34 of the tire tread. Alternatively, the upper edge 64 of the void 62 may be spaced a distance below the portion of the first molding member 52 that defines the outer surface 34 of the tire, whereby the tie bar 40 will be spaced from the outer surface 34, as shown and described above with respect to tie bar 40c shown in FIG. 2. The second molding member 56 further includes a groove-engaging portion 68 which extends to the groove bottom surface 36 and beneath the tie bar 40 such that the molded tie bar 40 is spaced from the groove bottom surface 36.

After the tread blocks 38, and the tie bars 40 have been formed, the mold 50 is opened to permit removal of the formed tire 10. As the mold 50 opens, the first molding member 52 is removed from the formed tire, as depicted in FIG. 4. Due to the resilient nature of the coupling 60 between the first and second molding members 52, 56, there is a short delay before the second molding member 56 is subsequently removed from the tire 10. In particular, as the first molding member 52 is removed from the formed tire 10, the second molding member 56 is displaced from the cavity 58 formed in the first molding member 52, and remains with the formed tire 10 until the first molding member 52 has moved a distance sufficient to permit the second molding member 56 to be removed. For example, second molding member 56 is able to articulate away from the formed tie bar 40 by moving along a groove formed by the first molding member 52, such as in the direction of arrow 70 shown in FIG. 4. The second molding member 56 is subsequently retracted into the cavity 58 in the first molding member 52, as depicted in FIG. 5, so that the mold 50 will be ready to make subsequent tires.

Figure 6:
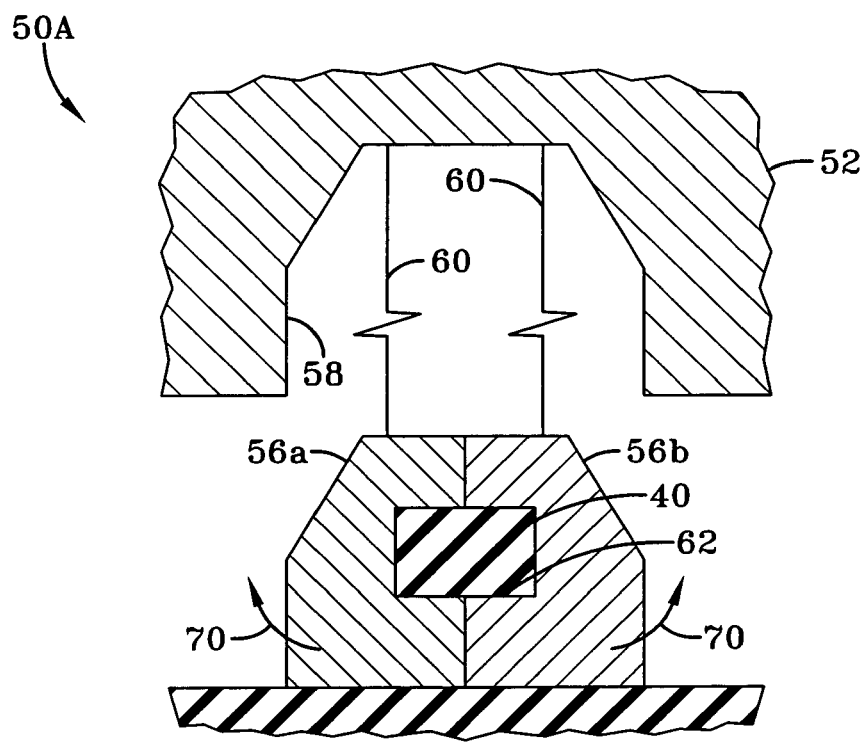
FIG. 6 is a schematic illustration depicting other exemplary mold elements for forming a tire according to the present invention.

FIG. 6 depicts another configuration of a mold 50a for forming a tire 10 according to the present invention, wherein the second molding member includes two elements 56a, 56b. The mold configuration of FIG. 6 is similar to that described above with respect to FIGS. 3-5, and like features have been similarly numbered. It will be recognized, however, that various other mold configurations may be utilized to create tie bars 40 according to the present invention.

In another aspect of the invention, a method of making a tire 10 utilizing, for example, a mold 50, 50a as described above, includes forming a tire tread 12 having a plurality of circumferential and lateral grooves 30, 32 which define a plurality of tread blocks 38 in the tire tread 12, and forming at least one tie bar 40 between at least two of the tread blocks 38 such that the tie bar 40 extends across at least one of the circumferential and lateral grooves 30, 32, and is spaced from a respective groove bottom surface 36 defined by the circumferential and lateral grooves 30, 32. In another embodiment, the method includes molding the tire tread 12 with the first molding member 52, forming the tie bar 40 with the second molding member 56 which is separable from the first molding member 52, removing the first molding member 52 from the formed tire 10, and removing the second molding member 56 from the formed tire 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described.

Accordingly, departures may be made from such details without departing from the scope or spirit of Applicant's general inventive concept.

What is claimed is:

1. A method of making a tire, comprising:
   forming a tire tread with a first molding member, the tread having a plurality of circumferential grooves and a plurality of lateral grooves, the circumferential and lateral grooves extending to a least one groove bottom surface and defining a plurality of tread blocks;
   forming at least one tie bar between at least two of the tread blocks with a second molding member that is separable from the first molding member, the tie bar extending across at least one of the circumferential grooves and spaced from the at least one groove bottom surface;
   moving the first molding member in a direction radially outwardly so as to remove the first molding member from the formed tread of the tire; and
   moving the second molding member along the length of the at least one of the circumferential grooves and removing the second molding member from the formed tread of the tire after the first molding member has moved radially outwardly.

2. The method of claim 1, wherein the first and second molding members are resiliently coupled together such that removing the first molding member from the formed tire facilitates automatic removal of the second molding member from the formed tire.

3. The method of claim 2, wherein the first and second molding members are resiliently coupled together such that there is a delay between removing the first molding member and automatically removing the second molding member.

4. A mold for making a tire, comprising:
   a least one first molding member configured to form a tire tread comprising a plurality of circumferential grooves, a plurality of lateral grooves, and a plurality of tread blocks defined by the circumferential and lateral grooves, the circumferential and lateral grooves extending to at least one groove bottom surface; and
   at least one second molding member configured to form at least one tie bar between at least two of the tread blocks in at least one of the circumferential grooves;
   said second molding member including a groove engaging portion that extends to the formed groove bottom surface such that the formed tie bar is spaced from the formed groove bottom surface;
   said second molding member cooperating with said first molding member such that when the mold is opened said first molding member moves in a direction radially outwardly so as to remove said first molding member from the formed tread of the tire, then said second molding member moves in along the length of the at least one of the circumferential grooves to thereby release the tie bar formed by said second molding member and remove said second molding member from the formed tread of the tire.

5. The mold of claim 4, wherein said second molding member comprises a plurality of sections that cooperatively engage to form the tie bar.

6. The mold of claim 4, wherein said second molding member is resiliently coupled to said first molding member such that removal of said first molding member from the formed tire facilitates automatic removal of said second molding member from the formed tire.

7. The mold of claim 6, wherein said second molding member is resiliently coupled to said first molding member such that there is a delay between removing said first molding member from the formed tire and automatically removing said second molding member from the formed tire.

* * * * *